(12) United States Patent
King

(10) Patent No.: US 6,359,348 B1
(45) Date of Patent: Mar. 19, 2002

(54) SEMI-PASSIVE KEYLESS ENTRY METHOD AND DEVICE

(75) Inventor: Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/440,070

(22) Filed: Nov. 15, 1999

(51) Int. Cl.⁷ .............................................. H01H 47/22
(52) U.S. Cl. ..................... 307/10.1; 307/9.1; 307/10.2; 307/10.3; 340/825.69
(58) Field of Search ...................... 340/825.72, 825.69; 307/10.1, 10.2, 10.3, 10.4, 9.1

(56) References Cited

U.S. PATENT DOCUMENTS 5,973,611 A * 10/1999 Kula et al. ............. 340/825.31
6,034,617 A * 3/2000 Luebke et al. ......... 340/825.31

* cited by examiner

Primary Examiner—Josie Ballato
Assistant Examiner—Robert L. Deberadinis
(74) Attorney, Agent, or Firm—Niro, Scavone, Haller & Niro

(57) ABSTRACT

A remote keyless entry system including a keyless fob having a transmitter for remote transmission of a semi-passive function control signal to an automobile in which the user does not have to manually actuate the fob while it transitions with the user from a point outside of its range with respect to the automobile to a point within its range. The user need only actuate the semi-passive signal transmission once and it is repetitively transmitted for a given amount of time whereby the trunk lid for example of the user's automobile will open as the user and the keyless fob move into a predetermined range from the automobile.

19 Claims, 2 Drawing Sheets

SEMI-PASSIVE KEYLESS ENTRY METHOD AND DEVICE

FIELD OF INVENTION

This invention relates to an improved keyless fob as used in conjunction with a vehicle receiving module which opens the vehicle door locks and/or trunk, for example, in response to transmissions from the fob.

BACKGROUND OF THE INVENTION

Systems for unlocking automobile doors and trunks include conventional keys, coded keypads on the automobile itself and lock systems which employ remote transmission, as for example from a key chain fob. While conventional keys and coded keypads may provide high security, many drivers today prefer to use keyless fobs for their greater convenience. Such fobs generally include one or more pushbutton keys or actuators that, when pressed, cause the fob to emit a coded transmission including both an identification code for the particular fob and information to authorize the execution of a particular action or vehicle function, e.g. unlocking the automobile doors or opening the trunk. A control module or receiver on the automobile at which the fob is pointed picks up the coded transmission and decodes it. Such a control module constitutes, or is part of, the general electronic module (GEM) controlling the electrical system of the automobile and powered by the standard automobile battery. If the identification code in the transmission identifies the fob as one assigned to that automobile, the control module causes the electrical system of the automobile to execute the indicated action. As a result, the driver of the automobile can unlock the door and/or the trunk for example as he or she approaches the automobile. Such lock systems are referred to as remote keyless entry (RKE) systems.

Typically RKE or keyless fob systems for automobiles are designed so that a user can push a fob button and actuate a vehicle function from at least 10 meters from the vehicle and upwards to 40 or 50 meters from the vehicle as a matter of design choice. A drawback to this type of conventional keyless fob involves the typical situation of when a user's hands may not be free to push a fob button as he/she approaches the related automobile. For example, a user may be carrying bags of groceries whereby the fob could not be actuated without having to unload the bags first; or, before picking up the bags the user may be beyond the range of the fob signal being received and even if the fob was operable at a distance significantly greater than the typical 10 to 50 meters range from the vehicle, the user may not feel comfortable opening his/her trunk or doors at such a distance and then having to approach the vehicle with hands encumbered.

OBJECTS AND SUMMARY OF THE INVENTION

Accordingly, an the object of the invention is to provide a semi-passive keyless fob entry system for an automobile wherein vehicular functions can be preprogramed to occur in a hands free fashion as the user approaches the vehicle.

It is another object of the invention to provide a keyless fob to operate in the above manner wherein the preprogrammed vehicular function will occur only when the user is within a relatively close, pre-determined distance of the vehicle; in this manner the user could return to a grocery store, for example, if something has been forgotten and not have to be concerned about placing bags down and re-locking the doors or trunk of the automobile involved.

It is yet another object of the invention to provide a keyless fob for an automobile which does not in any way compromise the user's safety in the sense of having preprogrammed functions occur prematurely in a hands free manner as the user approaches an automobile.

It is still another object of the invention to provide a keyless fob entry system for an automobile (or any device or structure) in which the hands free mode of operation can easily and conveniently be used with the conventional manual mode of operation of such fobs (wherein a button is simply pushed within the operating range of the fob with respect to the vehicle to immediately cause a vehicular function to occur).

DETAILED DESCRIPTION OF THE PREFERRED EMBODIMENT

Set forth below is a description of what is currently believed to be the preferred embodiment or best example of the invention claimed. Future and present alternatives and modifications to this preferred embodiment are contemplated. Any alternatives or modifications which make insubstantial changes in function, in purpose, in structure or in result are intended to be covered by the claims of my invention.

Figure 1:
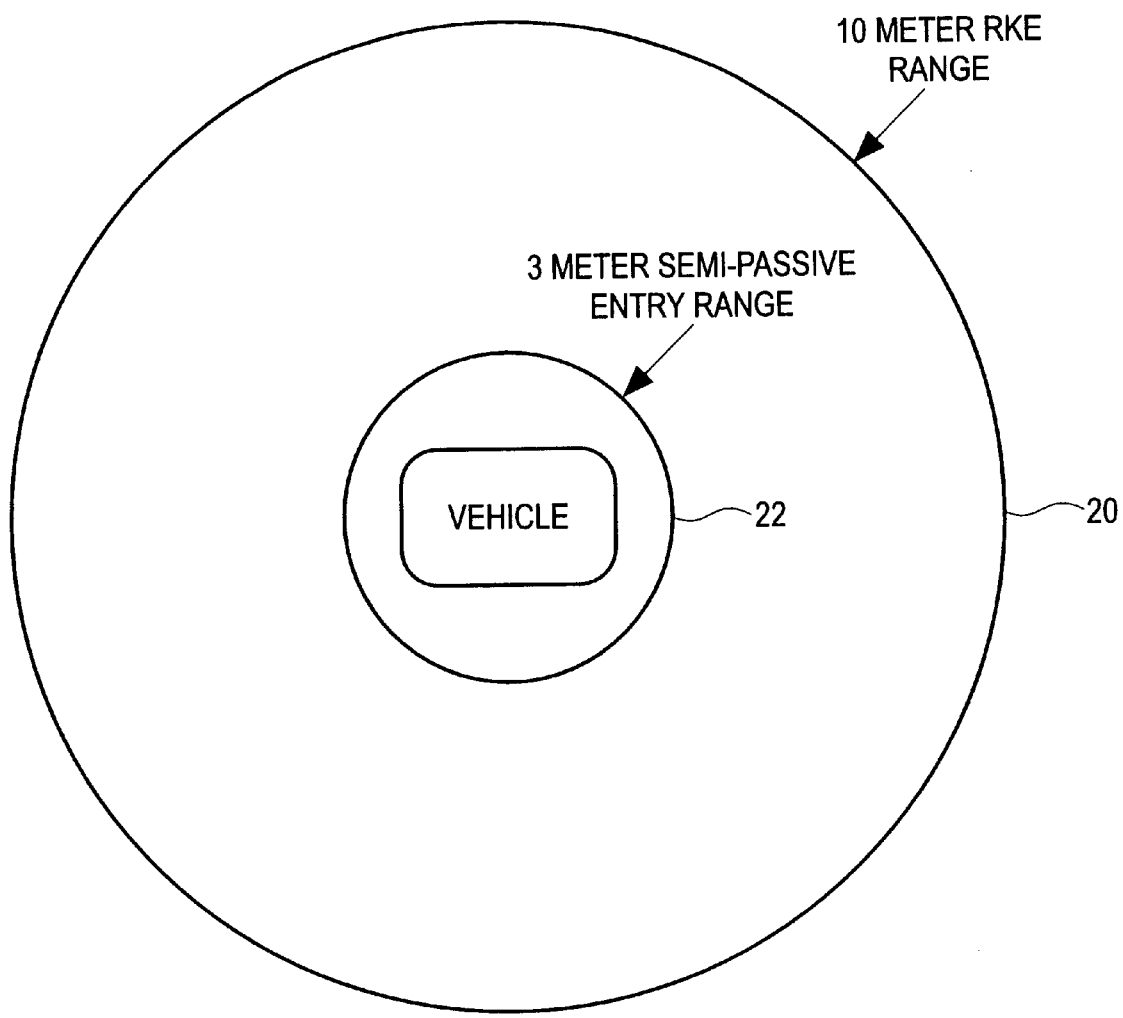
FIG. 1 is a schematic overview of the semi-passive range associated with the present invention in contrast to a relatively greater range of a manual keyless fob.

The basic setting for the present invention is considered in FIG. 1 in conjunction with the following description. As discussed in the background, prior art keyless fobs (also referred to as RKE (remote keyless entry) fobs) may include maximum operable ranges with respect to an automobile in the order of 40–50 meters and typically will be operable for at least a 10 meter range as indicated by the outer range 20 in FIG. 1. For purposes of describing the preferred embodiment of my invention at the present time, reference is made to prior art keyless fobs as manual fobs in the sense that an actuator or button typically has to be depressed by the user within the operating range of the manual fob to concurrently trigger a corresponding function in the automobile e.g. trunk release, door unlock, door lock. Of course, if a manual keyless fob is out of range with respect to its corresponding automobile or if the user's hands are not free to manually actuate the fob as the user approaches the automobile, the manual fob cannot be applied to select a function associated therewith.

A fundamental aspect of the present invention is that there will be situations in which the user will want the ability to actuate a keyless fob function as he/she approaches the vehicle without having to manually engage a pushbutton or actuator on the fob. For example, a user's hands could be encumbered while carrying purchased goods from a retail outlet to one's automobile. In such a situation, the user very well could be beyond the manual operating range when his/her hands are available to manually actuate the fob, but even if within range the question of whether a user would want to open his/her trunk from a significant distance away from the vehicle could still be present.

Accordingly, the present invention provides what I refer to as a semi-passive entry system or semi-passive keyless fob as indicated in FIG. 1. The semi-passive characterization is intended to include a keyless fob which passively actuates the desired vehicle function as the user approaches the vehicle without any manual or hand held actuation required. The semi-passive function may be incorporated into the same fob having manul functionality whereby the user may then select manual or semi-passive actuation. In terms of my preferred embodiment, the semi-passive range as considered in more detail below can be designed for a distance less than the manual range. For purposes of my preferred embodiment, the semi-passive range is operable only within a short distance of the automobile, on the order of 3 meters as indicated in FIG. 1 at 22. The reason for setting the sem-passive range to be relatively close to the vehicle involves a user who may be approaching the vehicle with hands not free and deciding for whatever reason that he/she may want to return to a store for something that has been forgotten for example. In such a situation, the user would not want the trunk lid to open or doors unlock while the forgotten item or whatever is being attended to.

The present invention is not intended to alter those operating ranges presently being used for manual keyless fobs. For example, relatively greater operating ranges may be desired for manual fobs operation when used for car locating purposes or panic alarm situations, which functions do not directly relate to the context in which the semi-passive functionality of the present invention is used. It is also believed that the more limited operating range of the semi-passive fob operation enhances safety consideration. In other words, when one is approaching his/her automobile with hands encumbered, it is not desirable necessarily to unlock the doors or the trunk lid when the user is on the order of 50 meters away from the vehicle.

Figure 2:
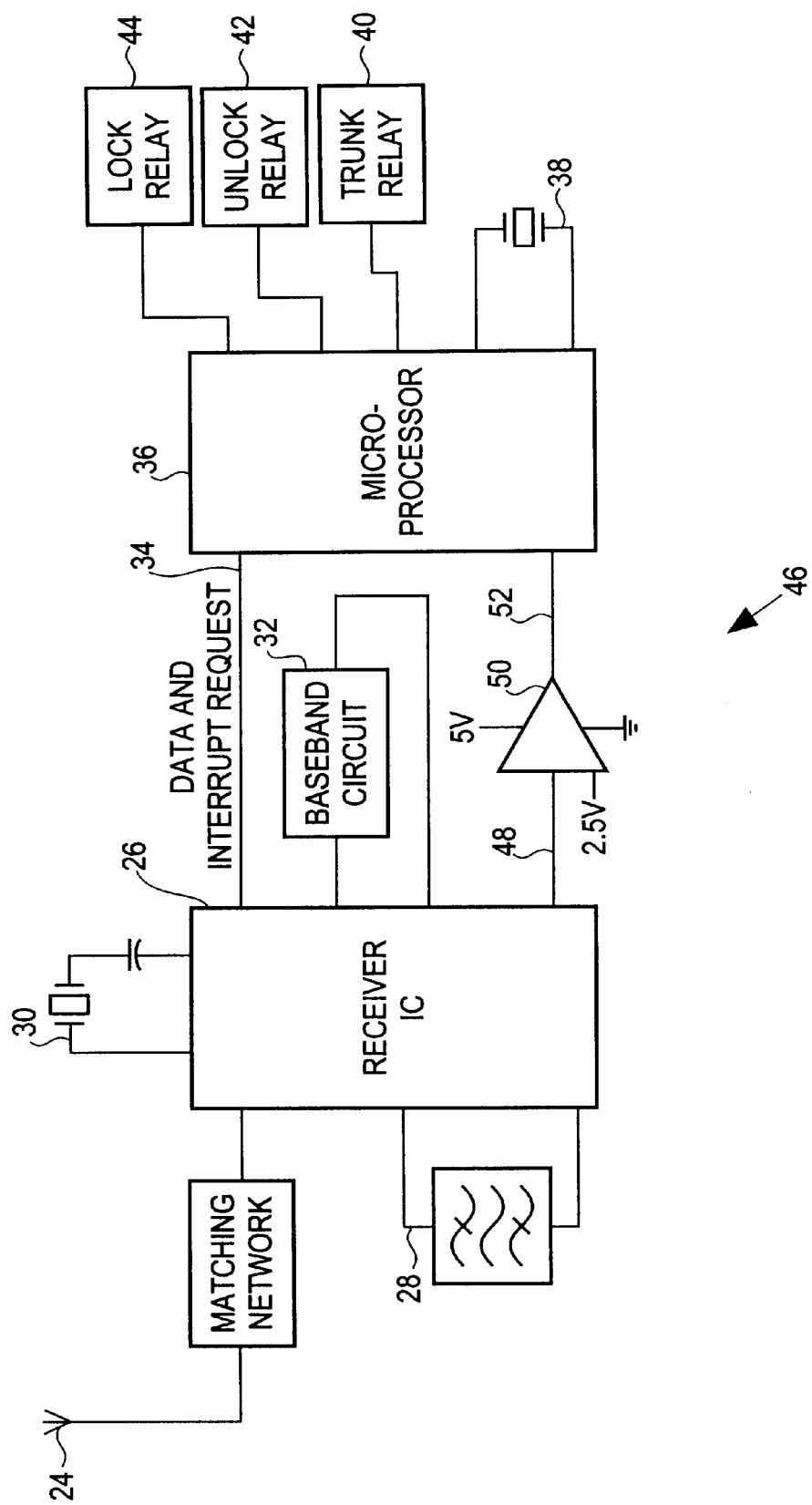
FIG. 2. is a stylized, simplified block diagram of a receiver usable with the keyless fob of the present invention.

FIG. 2 is intended to set forth a block diagram of a receiver network which would correspond to an RKE fob having the semi-passive functionality of the present invention. The receiver network of FIG. 2 would of course reside in the vehicle to which the keyless fob of the present invention is mated. The prior art has considered a number of ways to uniquely mate one or more keyless fobs to a corresponding vehicle receiver for obvious security reasons. Such security measures can involve encryption systems and the like which are not part of the present invention but, as readily apparent to those skilled in the art, are usable with the present invention.

As indicated at 24, the receiver network includes an antenna and matching network for receiving signals from the RKE fob. Although not shown, the fob has a transmitter for sending a signal to antenna 24, such transmitter operating in response to a pushbutton or other similar actuators. The signal transmitted is coded for the function selected, i.e. door unlock, trunk opening, etc. Within the context of the present invention, the transmitted signal would further include coding to indicate whether it was manually generated or semi-passively generated as considered hereinabove. The receiver IC 26 typically includes an IF filter circuit 28 and a local oscillator (LO) circuit 30 as well as base band circuitry as indicated at 32. A received signal passes on line 34 to microprocessor 36 which typically includes a resonator circuit 38. The microprocessor uses the received signal to control for example, the vehicle trunk, unlock, and lock relays as respectively shown at 40, 42, and 44.

As well known to those skilled in the art, the receiver 26 includes super-heterodyne architecture. In addition, RSSI (received signal strength indicator) circuitry generally indicated as 46 is provided between receiver 26 and microprocessor 36. As discussed with respect to FIG. 1, in my preferred embodiment the semi-passive functionality of the present invention is not operable until the user is approximately 3 meters or closer to the vehicle. Accordingly, it is an aspect of my invention that a RKE fob having semi-passive functionality operate in conjunction with the receiver network being able to determine whether the user (and fob) are 3 meters or closer to the vehicle before any semi-passive selected function is triggered. The RSSI circuitry 46 receives an indication of the fob input signal strength on line 48. The fob semi-passive input signal strength to antenna 24/receiver IC 26 will increase as the fob moves closer to the vehicle receiver with everything else being equal. The strength of the semi-passive input signal is monitored on line 48 and is compared in comparitor 50 against a signal level strength equivalent to the fob transmitting the semi-passive signal at 3 meters away for example from the vehicle. Accordingly, an output signal is provided on line 52 to microprocessor 36 to indicate as a threshold matter whether the fob is more than or less than 3 meters from the vehicle. In other words, even though a semi-passive signal may be received, if the semi-passive signal indicates that the fob is more than 3 meters from the vehicle, the corresponding functionality of the semi-passive signal will not be triggered by the microprocessor.

The preferred embodiment of my invention at the present time has been described above. Although not specifically illustrated in the drawings, there are further operational features which, as presently viewed, are also part of my preferred embodiment. As indicated, the manual and semi-passive functionalities are part of a single RKE fob. Manual actuation and use are the same as in previously available devices—the fob is pointed at the vehicle, a selected function button is pressed or actuated, and a correspondingly transmitted signal causes the selected function to occur if the vehicle is within the range of the fob transmitter. In my preferred embodiment, when the user intends to take advantage of the fob's semi-passive functionality, the function button is depressed and held down to activate repetitious transmission of a semi-passive function signal. Such repetitious transmission could be designed to continue for 15 minutes for example. An LED could be provided to confirm whether the repetitious semi-passive signal has been initiated. For example, the LED on the RKE fob body can be designed into the circuitry to provide one blink when the function button has been held only long enough for a corresponding manual signal and could provide two blinks to confirm that the function button has been pressed or held down long enough to initiate the repetitious semi-passive signal. This arrangement avoids the need for two actuation buttons for each function—one for manual and one for semi-passive actuation. Furthermore, the duration of the repetitious semi-passive signal being transmitted could be extended by the user if for example the 15 minute transmission duration as considered above was not deemed long enough for whatever reason. In this event, the user could again actuate or press down the function button for sufficient duration to obtain confirmation (two blinks of LED) that the semi-passive signal transmission has again been called for in which event the initial 15 minutes could be extended to a total of 30 minutes for example. Necessarily, the initial 15 minute duration mentioned, and the amount of time added by the user for whatever reason are simply matters of design choice.

In relation to the broader aspects of my invention, it is to be appreciated that the semi-passive signal will be repetitiously transmitted in a continuous fashion when the fob is beyond the semi-passive range of the vehicle and will result in the selected function occurring only when the user reaches the outermost limit of the semi-passive range with respect to the vehicle. Although the benefits of the present invention could still be enjoyed in good part without having a semi-passive range smaller than a manual range, I believe the relatively smaller semi-passive range to be the preferred way of practicing my invention. However, it is recognized that the relatively smaller semi-passive range could be eliminated whereby the manual and semi-passive ranges could be identical whereby the fundamental benefit of my invention would still be enjoyed. Furthermore, my preferred way of practicing the invention includes the vehicle receiver only acting on a semi-passive signal once during a repetitious semi-passive signal 15 minute (or user extended) cycle unless during the cycle the corresponding manual signal has been initiated. In other words, if the semi-passive trunk opening signal was being transmitted, it would continue to be transmitted after the trunk has opened and then been closed. In that event the continuation of the semi-passive signal to open the trunk will be of no effect for the balance of the cycle. On the other hand, once the semi-passive signal has timed out (end of 15 minute transmission cycle) or an interceding manual signal is received, another semi-passive signal generation cycle may be initiated by appropriate engagement of the pushbutton actuator.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. A keyless fob for use in a remote keyless entry system including a receiver, the receiver being mounted in an apparatus having a function, said fob comprising:
    a manually actuable signal actuator; and
    a transmitter for repetitively transmitting a wireless semi-passive signal for a predetermined period of time in response to manual actuation of said signal actuator for a semi-passive mode,
    where the apparatus is adapted to initiate the function in response to receipt of said semi-passive signal by the receiver while said fob is spaced from the receiver by no more than a predetermined semi-passive range, and
    where said predetermined period is long enough to enable hands-free initiation of the function after manual actuation of said signal actuator for the semi-passive mode outside of the semi-passive range.

2. The fob of claim 1, wherein said period of time is fifteen minutes.

3. The fob of claim 1, wherein said period of time is on the order of minutes.

4. The fob of claim 1, wherein said period of time is longer than one minute.

5. The fob of claim 1, wherein the apparatus is a vehicle and the function is unlocking an entry to the vehicle.

6. The fob of claim 1, wherein said fob is operable in a manual mode in response to a second manual actuation of said signal actuator for the manual mode, the second manual actuation being different from the first-mentioned manual actuation for the semi-passive mode,
    wherein in the manual mode said transmitter transmits a wireless second signal in response to the second manual actuation of said signal actuator, and
    where the apparatus is adapted to initiate the function in response to receipt of said second signal by the receiver while said fob is spaced from the receiver by no more than a predetermined manual range.

7. The fob of claim 6, wherein said signal actuator is a pushbutton, the manual actuation for the manual mode includes depressing said pushbutton for a first period of time and the manual actuation for the semi-passive mode includes depressing said pushbutton for a second period of time longer than the first period of time.

8. The fob of claim 6, wherein the manual range is greater than the semi-passive range.

9. The fob of claim 6, wherein the second signal is stronger than the semi-passive signal.

10. A receiver for use in a remote keyless entry system including a keyless fob, said receiver being mounted in an apparatus having a function, the fob including a manually actuable signal actuator and a transmitter for repetitively transmitting a wireless semi-passive signal for a predetermined period of time in response to manual actuation of the signal actuator for a semi-passive mode, said receiver comprising:
    receiver circuitry for receiving said semi-passive signal from the fob; and
    a detector for detecting whether or not the fob is spaced from said receiver by no more than a predetermined semi-passive range,
    where the apparatus is adapted to initiate the function in response to receipt of said semi-passive signal by said receiver circuitry while the fob is detected to be spaced from said receiver by no more than the predetermined semi-passive range, and
    where the predetermined period is long enough to enable hands-free initiation of the function after manual actuation of the signal actuator for the semi-passive mode outside of the semi-passive range.

11. The receiver of claim 10, wherein said detector detects that the fob is spaced from said receiver by no more than the predetermined range if said semi-passive signal has at least a predetermined strength.

12. The receiver of claim 10, wherein said period of time is fifteen minutes.

13. The receiver of claim 10, wherein said period of time is on the order of minutes.

14. The receiver of claim 10, wherein said period of time is longer than one minute.

15. The receiver of claim 10, wherein the apparatus is a vehicle and the function is unlocking an entry to the vehicle.

16. The receiver of claim 10, wherein the fob is operable in a manual mode in response to a second manual actuation of the signal actuator for the manual mode, the second manual actuation being different from the first-mentioned manual actuation for the semi-passive mode, wherein in the manual mode the transmitter transmits a wireless second signal in response to the second manual actuation of said signal actuator,
    said receiver circuitry being for receiving said second signal and said detector being for detecting whether or not the fob is spaced from said receiver by no more than a predetermined semi-passive range, where the apparatus is adapted to initiate the function in response to receipt of said second signal by said receiver circuitry while the fob is detected to be spaced from the receiver by no more than a predetermined manual range.

17. The receiver of claim 16, wherein the manual range is greater than the semi-passive range.

18. The receiver of claim 16, wherein the second signal is stronger than the semi-passive signal.

19. A method of operating a remote keyless entry system including a keyless fob and a receiver, where the fob includes a manually actuable signal actuator and a transmitter, and the receiver including receiver circuitry and a detector, said method comprising the steps of, in the fob:

manually actuating a signal actuator for a semi-passive mode; and repetitively transmitting a wireless semi-passive signal for a predetermined period of time in response to said actuating step, said method further comprising the steps of, in the receiver, receiving the semi-passive signal from the fob; and detecting whether or not the fob is spaced from the receiver by no more than a predetermined semi-passive range, where the apparatus is adapted to initiate the function in response to receipt of the semi-passive signal by the receiver while the fob is spaced from the receiver by no more than the predetermined semi-passive range, and where the predetermined period is long enough to enable hands-free initiation of the function after said actuating step outside of the semi-passive range.

* * * * *